Patented Feb. 23, 1932

1,846,644

UNITED STATES PATENT OFFICE

HANS KRZIKALLA, OF MANNHEIM, GERMANY, ASSIGNOR TO GENERAL ANILINE WORKS, INC., OF NEW YORK, N. Y., A CORPORATION OF DELAWARE

AZO DYESTUFFS

No Drawing. Application filed July 22, 1930, Serial No. 469,926, and in Germany July 27, 1929.

The present invention relates to new azo dyestuffs and complex chromium compounds thereof.

I have found that valuable azo dyestuffs are obtained by coupling diazotized aminoarylsulphonic acid amides or aminoarylcarboxylic acid amides or their derivatives, such as their halogen or nitro derivatives, with 1-phenyl-3-methyl-5-pyrazolones which contain a hydroxyl group and a carboxyl group in the ortho position to one another in the phenyl radicle, and which if desired may contain other substituents. The azo dyestuffs thus produced correspond to the general formula:

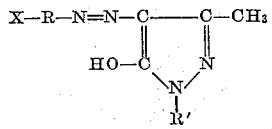

in which X stands for an amide of an acid radicle selected from the group consisting of sulphonic and carboxylic acid radicles, R for an aryl radicle which may be further substituted, and R' for a salicylic acid radicle which may be further substituted.

These dyestuffs give good, even, usually yellow to orange dyeings of very good properties as regards fastness which are still further improved by after chroming on the fibre. The complex chromium compounds of the said dyestuffs may also be produced by chroming the dyestuffs in substance by the usual methods. The dyestuffs containing sulphonic groups may be converted into lakes with barium or calcium salts and may then be employed as wall paper colours, graphic colours and the like.

The following example will further illustrate the nature of this invention, but the invention is not restricted thereto. The parts are by weight.

Example 1

17.2 parts of metanilic acid amide are diazotized in the usual manner in 25 parts of approximately 35 per cent hydrochloric acid with 7 parts of sodium nitrite while cooling with ice and the whole is then allowed to flow into a solution of 34 parts of (2'-hydroxy-3'-carboxy-5'-sulpho)-1-phenyl-3-methyl-5-pyrazolone containing an excess of sodium carbonate. The formation of the dyestuff is completed very rapidly. After salting out, a yellow dyestuff is obtained which dyes wool uniform greenish yellow shades and has a very good fastness to light.

By boiling the dyestuff so obtained with an aqueous solution of chromium formate the complex chromium compound is obtained which likewise dyes wool uniform beautiful yellow shades. The fastness of the dyeings to washing, fulling and light is excellent.

The azo dyestuffs prepared in a corresponding manner from diazotized sulphanilic acid amide has similar tinctorial properties while the dyestuff obtained by coupling with 1-aminonaphthalene-4-sulphamide gives redder dyeings.

Instead of the (2'-hydroxy-3'-carboxy-5'-sulpho)-1-phenyl-3-methyl-5-pyrazolone, the corresponding unsulphonated pyrazolone may for example be employed for the coupling. The shade of the azo dyestuff so obtained differs very little from that of the dyestuff prepared with the sulphonated pyrazolone.

Example 2

13.6 parts of m-amino benzoic acid amide are diazotized as described in the foregoing example and coupled with 34 parts of (2'-hydroxy-3'-carboxy-5'-sulpho)-1-phenyl-3-methyl-5-pyrazolone dissolved in a solution rendered alkaline by sodium carbonate. The readily formed dyestuff is a yellow powder which when boiled for a short time with an aqueous solution of an excess of chromium formate, gives a complex chromium compound which dyes wool yellow shades fast to light, washing and milling.

The dyestuffs derived from amino-benzene carboxylic acid amides which are substituted by halogen atoms or nitro groups in the benzene ring differ only slightly from the corresponding non-substituted dyestuffs. Frequently the colour is changed only slightly to red by such substitution.

What I claim is:

1. As a new article of manufacture the azo dyestuff corresponding to the formula:

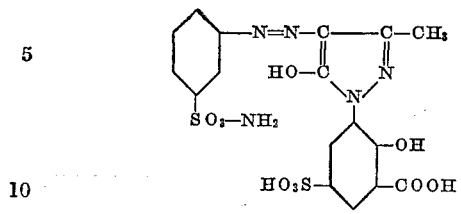

forming a yellow powder and dyeing wool fast even greenish yellow shades.

2. As new articles of manufacture azo dyestuffs corresponding to the formula:

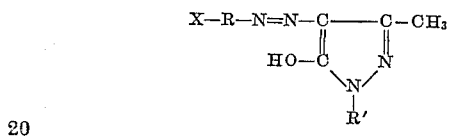

in which X stands for an amide of an acid radicle selected from the group consisting of sulphonic and carboxylic acid radicles, R for a radicle of the benzene series which may be substituted by halogen or nitro groups, and R' for a salicylic acid radicle which may be substituted by a sulphonic acid group.

In testimony whereof I have hereunto set my hand.

HANS KRZIKALLA.